United States Patent
Qi et al.

(10) Patent No.: US 12,484,035 B2
(45) Date of Patent: Nov. 25, 2025

(54) APPARATUS AND METHOD FOR DEPRECODING A SIGNAL FOR A MACHINE LEARNING MODEL

(71) Applicant: Nokia Solutions and Networks Oy, Espoo (FI)

(72) Inventors: Wen Liang Qi, Shanghai (CN); Chenhui Ye, Shanghai (CN); Dani Johannes Korpi, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/880,616

(22) PCT Filed: Jul. 4, 2022

(86) PCT No.: PCT/CN2022/103616
§ 371 (c)(1),
(2) Date: Jan. 2, 2025

(87) PCT Pub. No.: WO2024/007109
PCT Pub. Date: Jan. 11, 2024

(65) Prior Publication Data
US 2025/0261176 A1 Aug. 14, 2025

(51) Int. Cl.
*H04W 72/0453* (2023.01)
*H04L 25/02* (2006.01)
(Continued)

(52) U.S. Cl.
CPC ..... *H04W 72/0453* (2013.01); *H04L 25/0254* (2013.01); *H04L 27/2647* (2013.01);
(Continued)

(58) Field of Classification Search
CPC ......... H04W 72/0453; H04L 27/26526; H04L 27/26536; H04L 41/16; H04L 27/2647; H04L 25/0254
See application file for complete search history.

(56) References Cited

U.S. PATENT DOCUMENTS

| | | | |
|---|---|---|---|
| 2020/0236579 A1* | 7/2020 | Cho | H04W 24/10 |
| 2021/0160149 A1* | 5/2021 | Ma | H04W 72/20 |
| 2023/0139174 A1* | 5/2023 | Paz | H04B 7/12 |
| | | | 370/329 |

FOREIGN PATENT DOCUMENTS

| | | |
|---|---|---|
| CN | 110198282 A | 9/2019 |
| CN | 114342293 A | 4/2022 |

(Continued)

OTHER PUBLICATIONS

"New SI: Study on Artificial Intelligence (AI)/Machine Learning (ML) for NR Air Interface", 3GPP TSG RAN Meeting #94e, RP-213599, Agenda: 8.6.1, Qualcomm, Dec. 6-17, 2021, 6 pages.
(Continued)

Primary Examiner — Omar J Ghowrwal
(74) Attorney, Agent, or Firm — Nokia Technologies Oy

(57) ABSTRACT

An apparatus for a receiver is provided, said apparatus comprising means for receiving an input signal, based on a frequency domain signal, means for performing deprecoding on the received input signal and means for providing the deprecoded signal as an input for a machine learning model, wherein the output of the machine learning model is a likelihood ratio.

20 Claims, 18 Drawing Sheets

(51) Int. Cl.
*H04L 27/26* (2006.01)
*H04L 41/16* (2022.01)

(52) U.S. Cl.
CPC .. *H04L 27/26526* (2021.01); *H04L 27/26536* (2021.01); *H04L 41/16* (2013.01)

(56) References Cited

FOREIGN PATENT DOCUMENTS

| WO | WO-2016075475 A1 * | 5/2016 | ............ H03M 13/27 |
|----|---------------------|--------|-------------------------|
| WO | 2021/222915 A1 | 11/2021 | |

OTHER PUBLICATIONS

"3rd Generation Partnership Project; Technical Specification Group Radio Access Network; NR; Physical layer procedures for control (Release 17)", 3GPP TS 38.213, V17.0.0, Dec. 2021, pp. 1-225.

"3rd Generation Partnership Project; Technical Specification Group Radio Access Network; NR; Physical layer procedures for data (Release 17)", 3GPP TS 38.214, V17.0.0, Dec. 2021, pp. 1-217.

Honkala et al., "DeepRx: Fully Convolutional Deep Learning Receiver", IEEE Transactions on Wireless Communications, vol. 20, No. 6, Jun. 2021, pp. 3925-3940.

"3rd Generation Partnership Project; Technical Specification Group Radio Access Network; NR; Physical channels and modulation (Release 17)", 3GPP TS 38.211, V17.0.0, Dec. 2021, pp. 1-134.

Dahlman et al., "5G NR—The Next Generation Wireless Access Technology", Academic Press, 2018, 15 pages.

Korpi et al., "DeepRx MIMO: Convolutional MIMO Detection with Learned Multiplicative Transformations", IEEE International Conference on Communications, Jun. 14-23, 2021, 7 pages.

International Search Report and Written Opinion received for corresponding Patent Cooperation Treaty Application No. PCT/CN2022/103616, dated Dec. 22, 2022, 10 pages.

* cited by examiner

APPARATUS AND METHOD FOR DEPRECODING A SIGNAL FOR A MACHINE LEARNING MODEL

RELATED APPLICATION

This application claims benefit of priority from International Patent App. No. PCT/CN2022/103616, filed Jul. 4, 2022, the disclosure of which is hereby incorporated in its entirety by reference herein.

FIELD

The present application relates to a method, apparatus, system and computer program and in particular but not exclusively to a deep learning receiver for a Discrete Fourier Transform (DFT)-spread-Orthogonal Frequency Division Multiplexing (OFDM) signal.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus for a receiver, the apparatus comprising means for receiving an input signal, based on a frequency domain signal, means for performing deprecoding on the received input signal and means for providing the deprecoded signal as an input for a machine learning model, wherein the output of the machine learning model is a likelihood ratio.

Means for performing deprecoding may comprise an inverse Discrete Fourier Transform, iDFT, deprecoding function.

The apparatus may comprise means for performing the deprecoding on a data branch of the input signal.

The data branch may comprise frequency-time grid symbols symbols $N_f \times N_t$, where $N_f$ comprises the number of subcarriers and $N_t$ comprises number of orthogonal frequency-division multiplexing, OFDM, symbols.

The apparatus may comprise means for concatenating the deprecoded signal with a raw channel estimate branch of the frequency domain signal and providing the concatenated signal as the input for the machine learning model.

The apparatus may comprise means for providing the input signal, prior to deprecoding, to a further machine learning model for processing the input signal, and means for performing deprecoding on an output of the further machine learning model.

The output of the further machine learning model may be $2 \times N_f \times N_t$, where $N_f$ comprises iDFT size and $N_t$ comprises the number of orthogonal frequency-division multiplexing, OFDM, symbols.

The output of the further machine learning model may further comprise a constellation monitoring output.

The apparatus may comprise means for causing a trigger to be sent to an apparatus for training the machine learning model and, if present, the further machine learning model and means for receiving an acknowledgment from the apparatus in response to the request.

The apparatus may comprise means for providing training configuration information to the apparatus, means for receiving training data from the apparatus in response to the configuration information and means for providing the training data to an entity for training the machine learning model and, if present, the further machine learning model.

The apparatus may comprise means for receiving deployment configuration information from a transmitter of the input signal and means for determining whether to deploy the machine learning model and, if present, the further machine learning model based on the deployment configuration information.

The deployment configuration information may comprise at least one of an indication to perform the deprecoding on the frequency domain signal, subcarrier number information, modulation and coding scheme, rank and a fallback indicator.

The apparatus may comprise means for determining not to deploy the machine learning model and, if present, the further machine learning model based on the fallback indicator.

In a second aspect there is provided a method for a receiver, the method comprising receiving an input signal, based on a frequency domain signal, performing deprecoding on the received input signal and providing the deprecoded signal as an input for a machine learning model, wherein the output of the machine learning model is a likelihood ratio.

Performing deprecoding may comprise an inverse Discrete Fourier Transform, iDFT, deprecoding function.

The method may comprise performing the deprecoding on a data branch of the input signal.

The data branch may comprise frequency-time grid symbols symbols $N_f \times N_t$, where $N_f$ comprises the number of subcarriers and $N_t$ comprises number of orthogonal frequency-division multiplexing, OFDM, symbols.

The method may comprise concatenating the deprecoded signal with a raw channel estimate branch of the frequency domain signal and providing the concatenated signal as the input for the machine learning model.

The method may comprise providing the input signal, prior to deprecoding, to a further machine learning model for processing the input signal, and performing deprecoding on an output of the further machine learning model.

The output of the further machine learning model may be $2 \times N_f \times N_t$, where $N_f$ comprises iDFT size and $N_t$ comprises the number of orthogonal frequency-division multiplexing, OFDM, symbols.

The output of the further machine learning model may further comprise a constellation monitoring output.

The method may comprise causing a trigger to be sent to an apparatus for training the machine learning model and, if present, the further machine learning model and receiving an acknowledgment from the apparatus in response to the request.

The method may comprise providing training configuration information to the apparatus, receiving training data from the apparatus in response to the configuration information and providing the training data to an entity for training the machine learning model and, if present, the further machine learning model.

The method may comprise receiving deployment configuration information from a transmitter of the input signal and determining whether to deploy the machine learning model and, if present, the further machine learning model based on the deployment configuration information.

The deployment configuration information may comprise at least one of an indication to perform the deprecoding on the frequency domain signal, subcarrier number information, modulation and coding scheme, rank and a fallback indicator.

The method may comprise determining not to deploy the machine learning model and, if present, the further machine learning model based on the fallback indicator.

In a third aspect there is provided an apparatus comprising: at least one processor and at least one memory including a computer program code, the at least one memory and computer program code configured to, with the at least one processor, cause the apparatus at least to, at a receiver, receive an input signal, based on a frequency domain signal, perform deprecoding on the received input signal and provide the deprecoded signal as an input for a machine learning model, wherein the output of the machine learning model is a likelihood ratio.

The apparatus may comprise an inverse Discrete Fourier Transform, iDFT, deprecoding function.

The apparatus may be caused to perform the deprecoding on a data branch of the input signal.

The data branch may comprise frequency-time grid symbols symbols $N_f \times N_t$, where $N_f$ comprises the number of subcarriers and $N_t$ comprises number of orthogonal frequency-division multiplexing, OFDM, symbols.

The apparatus may be caused to concatenate the deprecoded signal with a raw channel estimate branch of the frequency domain signal and provide the concatenated signal as the input for the machine learning model.

The apparatus may be caused to provide the input signal, prior to deprecoding, to a further machine learning model for processing the input signal, and perform deprecoding on an output of the further machine learning model.

The output of the further machine learning model may be $2 \times N_f \times N_t$, where $N_f$ comprises iDFT size and $N_t$ comprises the number of orthogonal frequency-division multiplexing, OFDM, symbols.

The output of the further machine learning model may further comprise a constellation monitoring output.

The apparatus may be caused to cause a trigger to be sent to an apparatus for training the machine learning model and, if present, the further machine learning model and receive an acknowledgment from the apparatus in response to the request.

The apparatus may be caused to provide training configuration information to the apparatus, receive training data from the apparatus in response to the configuration information and provide the training data to an entity for training the machine learning model and, if present, the further machine learning model.

The apparatus may be caused to receive deployment configuration information from a transmitter of the input signal and determine whether to deploy the machine learning model and, if present, the further machine learning model based on the deployment configuration information.

The deployment configuration information may comprise at least one of an indication to perform the deprecoding on the frequency domain signal, subcarrier number information, modulation and coding scheme, rank and a fallback indicator.

The apparatus may be caused to determine not to deploy the machine learning model and, if present, the further machine learning model based on the fallback indicator.

In a fourth aspect there is provided a computer readable medium comprising program instructions for causing an apparatus to perform at least the following at a receiver, receiving an input signal, based on a frequency domain signal, performing deprecoding on the received input signal and providing the deprecoded signal as an input for a machine learning model, wherein the output of the machine learning model is a likelihood ratio.

Performing deprecoding may comprise an inverse Discrete Fourier Transform, iDFT, deprecoding function.

The apparatus may be caused to perform performing the deprecoding on a data branch of the input signal.

The data branch may comprise frequency-time grid symbols symbols $N_f \times N_t$, where $N_f$ comprises the number of subcarriers and $N_t$ comprises number of orthogonal frequency-division multiplexing, OFDM, symbols.

The apparatus may be caused to perform concatenating the deprecoded signal with a raw channel estimate branch of the frequency domain signal and providing the concatenated signal as the input for the machine learning model.

The apparatus may be caused to perform providing the input signal, prior to deprecoding, to a further machine learning model for processing the input signal, and performing deprecoding on an output of the further machine learning model.

The output of the further machine learning model may be $2 \times N_f \times N_t$, where $N_f$ comprises iDFT size and $N_t$ comprises the number of orthogonal frequency-division multiplexing, OFDM, symbols.

The output of the further machine learning model may further comprise a constellation monitoring output.

The apparatus may be caused to perform causing a trigger to be sent to an apparatus for training the machine learning model and, if present, the further machine learning model and receiving an acknowledgment from the apparatus in response to the request.

The apparatus may be caused to perform providing training configuration information to the apparatus, receiving training data from the apparatus in response to the configuration information and providing the training data to an entity for training the machine learning model and, if present, the further machine learning model.

The apparatus may be caused to perform receiving deployment configuration information from a transmitter of the input signal and determining whether to deploy the machine learning model and, if present, the further machine learning model based on the deployment configuration information.

The deployment configuration information may comprise at least one of an indication to perform the deprecoding on the frequency domain signal, subcarrier number information, modulation and coding scheme, rank and a fallback indicator.

The apparatus may be caused to perform determining not to deploy the machine learning model and, if present, the further machine learning model based on the fallback indicator.

In a fifth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs). Changes to the network architecture may depend on the need to support various radio technologies and finer QoS support, and some on-demand requirements for example QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

5G networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
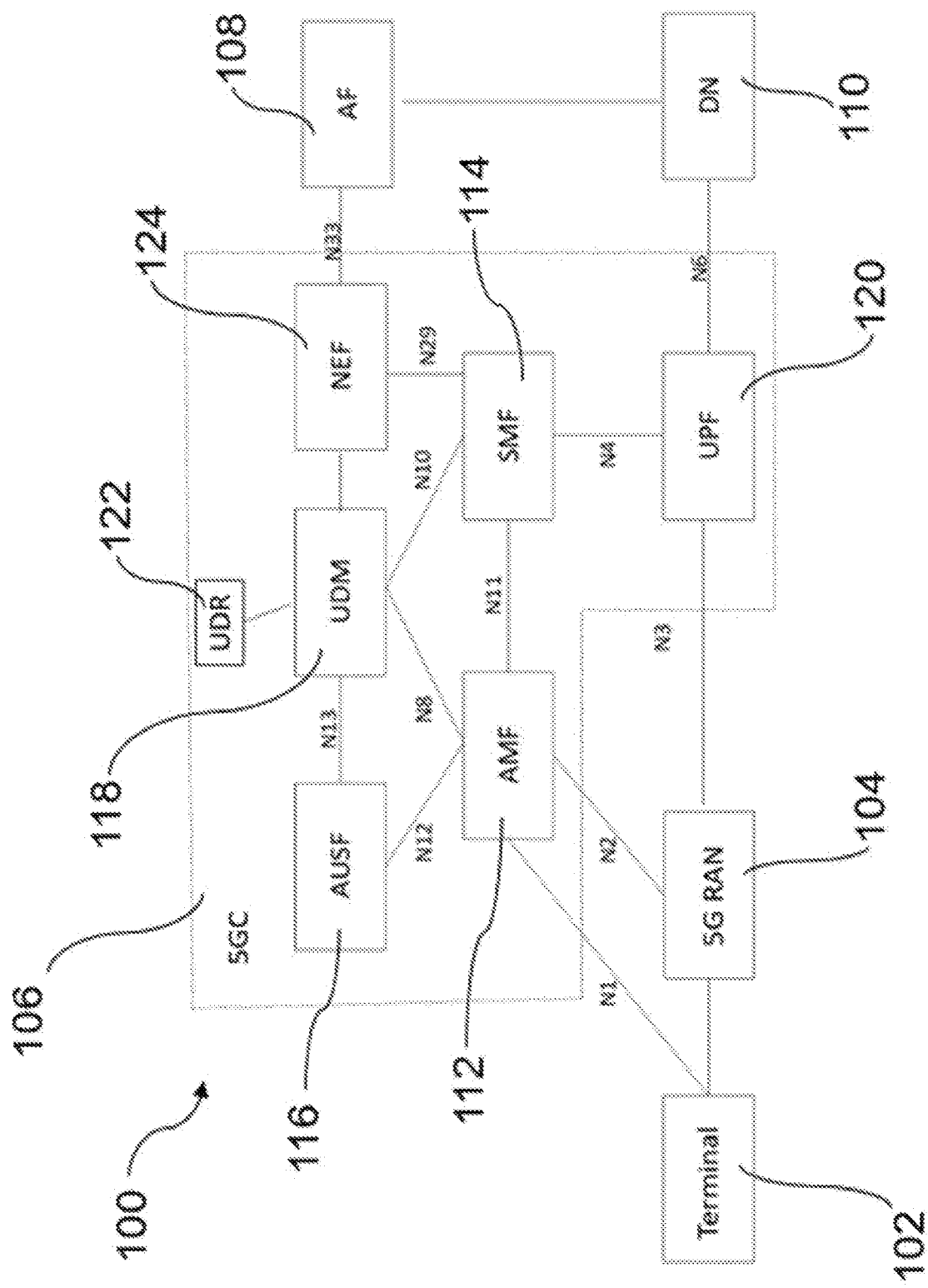
FIG. 1 shows a schematic diagram of an example 5GS communication system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a terminal device via the radio access network (RAN). The 5GRAN may comprise one or more gNodeB (GNB) distributed unit functions connected to one or more gNodeB (GNB) centralized unit functions. The RAN may comprise one or more access nodes.

A UPF (User Plane Function) whose role is called PSA (Protocol Data Unit (PDU) Session Anchor) may be responsible for forwarding frames back and forth between the DN (data network) and the tunnels established over the 5G towards the UE(s) exchanging traffic with the DN.

Figure 2:
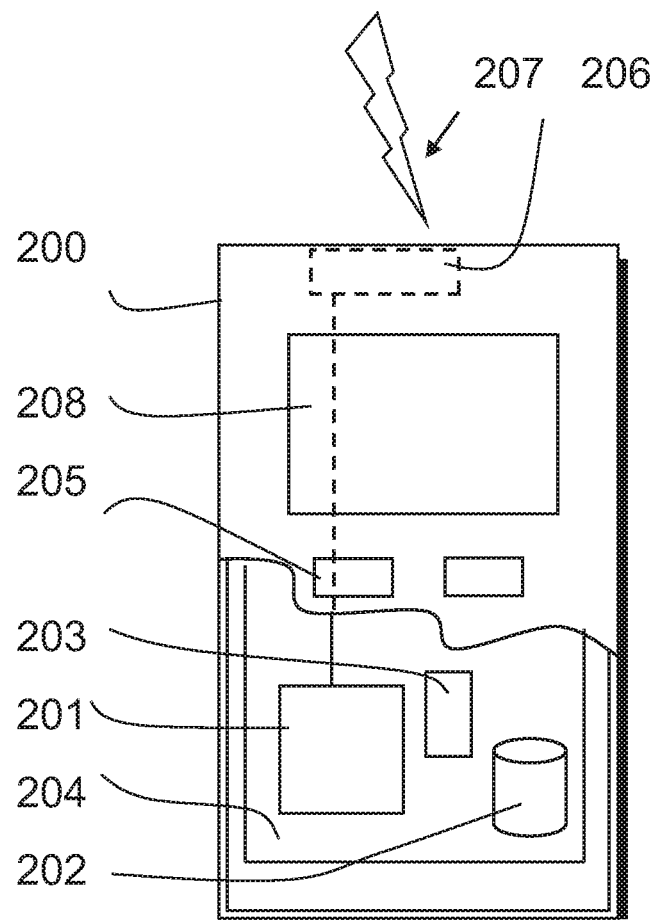
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VOIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
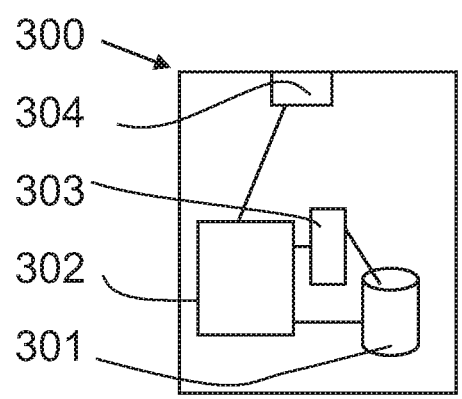
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Technology known as DeepRx (deep learning receiver) aims to leverage customized AI/ML techniques to augment capacity on the physical layer (PHY). Non-negligible performance gain over conventional methods in terms of reduced transmission error under the same radio frequency (RF) channel condition has been demonstrated in studies of DeepRx based on both simulation and real-world data. Meanwhile, superiority in terms of robustness against diverse channel condition and Doppler effects has also been shown.

Figure 4:
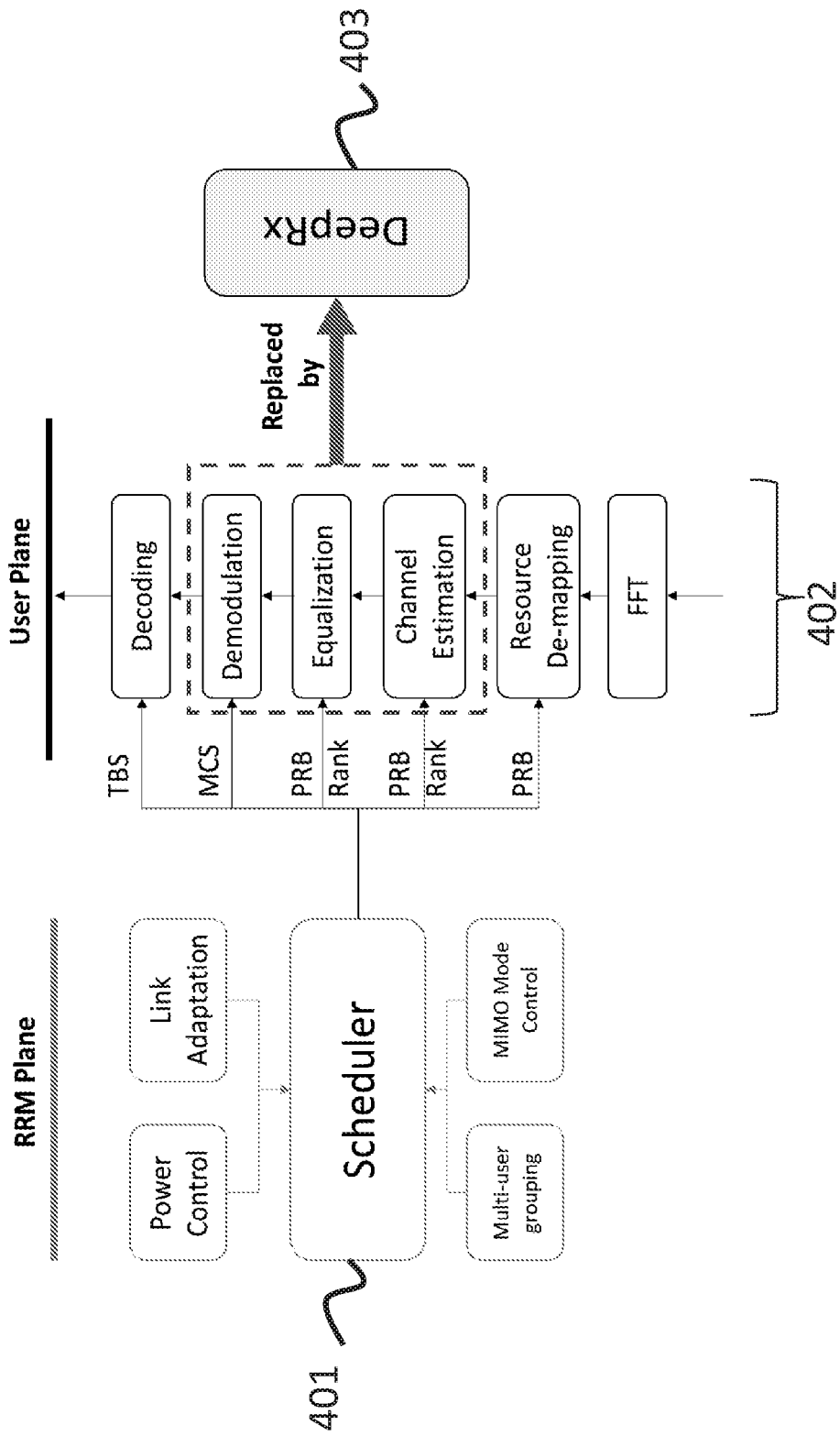
FIG. 4 shows a block diagram of a conventional UL receiver architecture with a potential DeepRx replacement.

FIG. 4 depicts a conventional uplink (UL) receiver architecture with multiple digital signal processing (DSP) blocks 402, including channel estimation, equalization and demodulation. DeepRx 403 may be used to replace DSP blocks, e.g., the channel estimation, equalization and demodulation blocks as illustrated in FIG. 4. That is, de-mapped frequency-time-domain data in the user plane, together with key messages from a scheduler 401 such as modulation and coding scheme (MCS), physical resource block (PRB), and Rank in radio resource management (RRM)-plane will become the input to DeepRx 403. The output of DeepRx 403 may be fed to a legacy decoding functional module.

Figure 5:
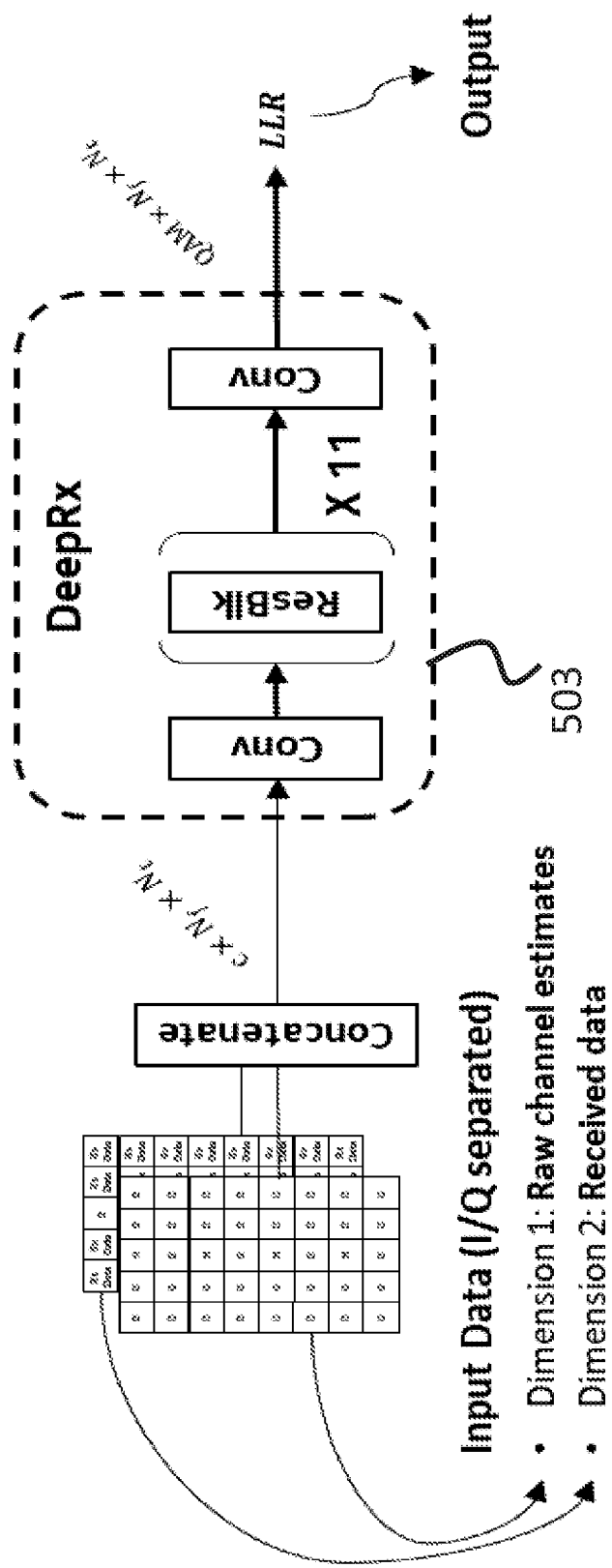
FIG. 5 shows a block diagram of a DeepRx structure for an OFDM system.

FIG. 5 shows an example DeepRx structure for an orthogonal frequency-division multiplexing (OFDM) system. The structure comprise a deep convolutional neural network (CNN) 503 structured receiver designed for OFDM signal detection. DeepRx 503 takes frequency-time domain resource elements (after fast Fourier transform (FFT)) of received data and corresponding raw channel estimates as input and outputs the bit likelihood ratio (LLR) for decoding. By leveraging frequency-time domain correlations and the transmission symbols' distribution pattern, DeepRx 503 can outperform traditional receiver schemes, such as those based on conventional LMMSE receivers.

Discrete Fourier transform (DFT)-Spread OFDM (DFTS-OFDM) has been adopted to enlarge power amplifier (PA) efficiency on the device side in the uplink transmission. It is designed with coverage-challenged situations and supports flexible discrete Fourier transform (DFT) sizes in implementation. Support for DFTS-OFDM is mandatory in the device and the network can therefore configure DFT-precoding for a particular device whenever necessary.

Figure 6:
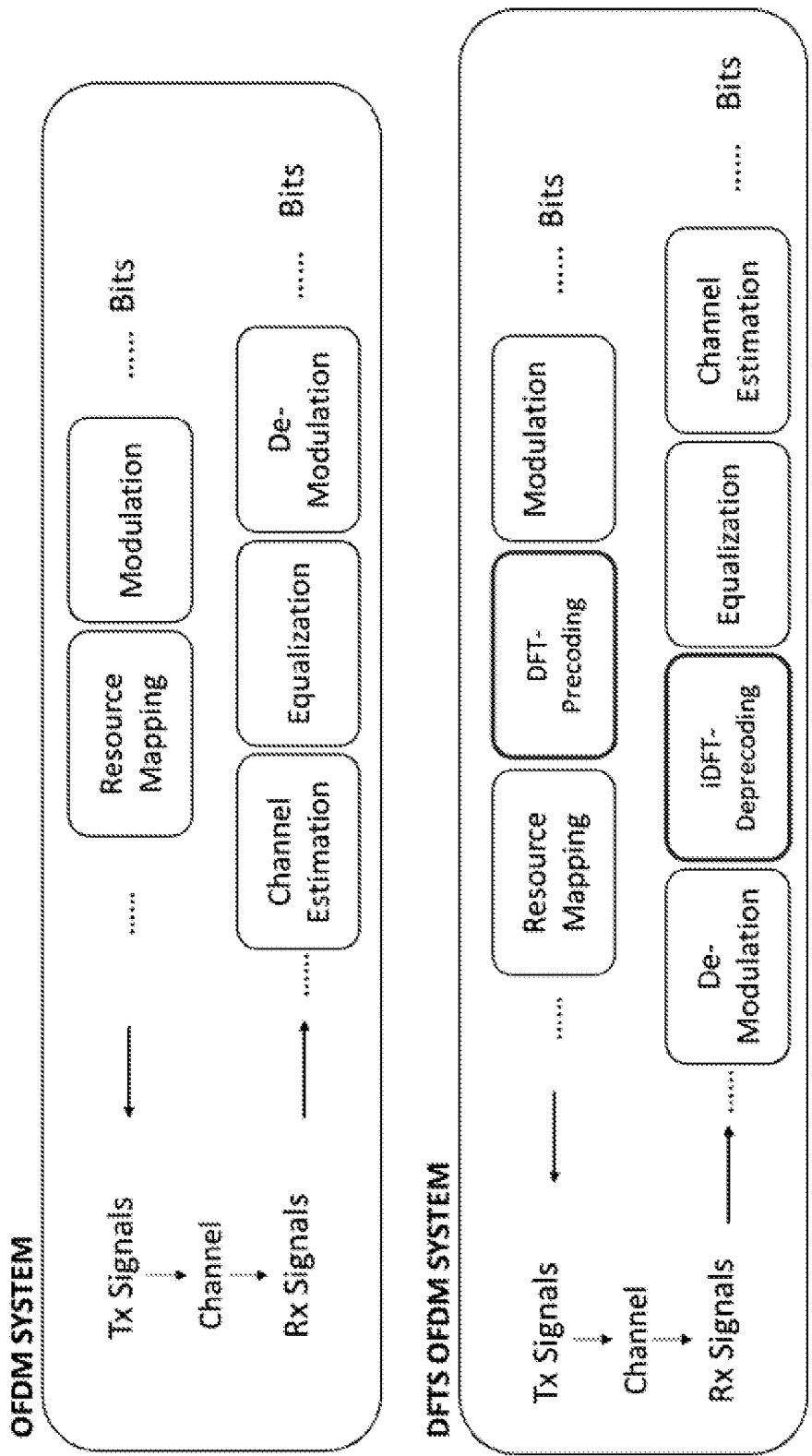
FIG. 6 shows a transmitter (Tx) and receiver (Rx) signal processing chain for OFDM and DFTS-OFDM systems.

FIG. 6 shows a transmitter (Tx) and receiver (Rx) signal processing chain for an OFDM system and a DFTS-OFDM system. The DFTS-OFDM Tx signal processing chain includes DFT precoding and the DFTS-OFDM Rx signal processing chain includes inverse DFT (iDFT) deprecoding.

As described in 3GPP specifications, a UE determines whether or not to apply transform (DFT) precoding and the UE shall consider the transform (DFT) precoding either 'enabled' or 'disabled' according to the higher layer configured parameter.

Therefore, compatibility with a DFTS-OFDM system is a requirement for future implementations of DeepRx, especially when it is deployed in base station (BS) side.

Success of DeepRx on Single Input Single Output (SISO) or Multiple Input Multiple Output (MIMO) OFDM systems has been shown. Nevertheless, nonnegligible performance drop or difficulties in DeepRx training has been observed when it comes to single-carrier OFDM scenarios, e.g., DFTS-OFDM In other words, current DeepRx is not compatible with the format of DFTS-OFDM, which is a mandatory feature for beyond 5G devices to support as mentioned above. Incompatibility of DeepRx to the DFTS-OFDM system may be due to the fact that the CNN structured DeepRx may not be able to learn to mimic the iDFT deprecoding operation which spans across the whole OFDM frame (shown in FIG. 6). Thus, customized system design is required to make DeepRx compatible with DFTS-OFDM waveforms.

Figure 7:
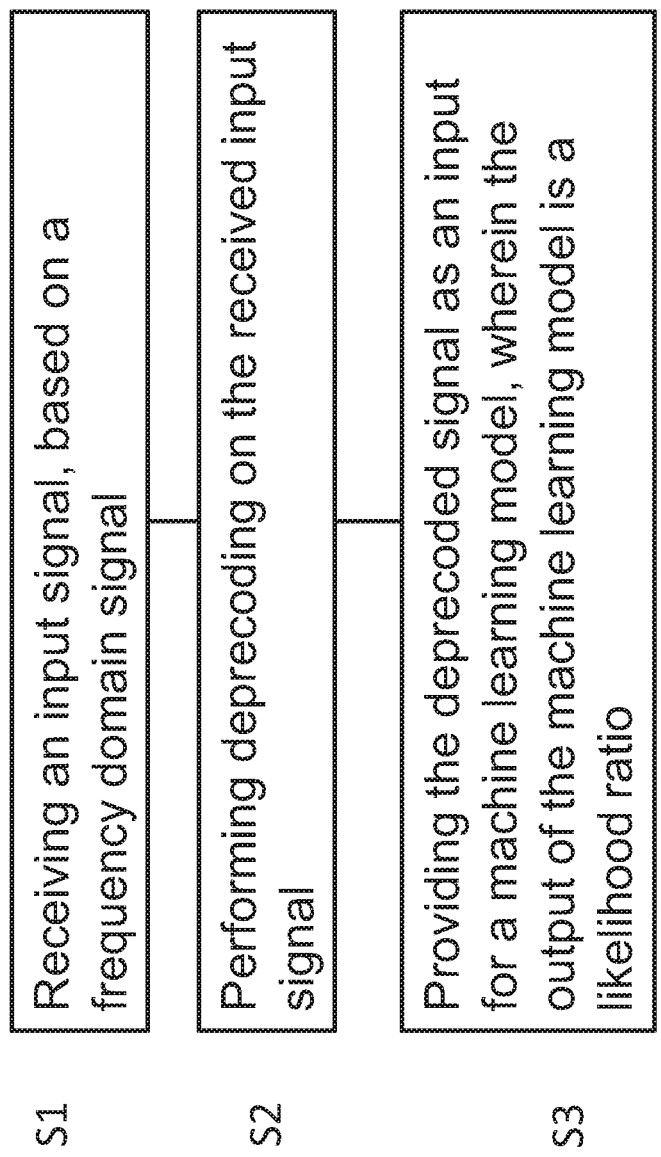
FIG. 7 shows a flowchart of a method according to an example embodiment.

FIG. 7 shows a flowchart of a method according to an example embodiment. The method may be performed at a receiver.

In S1, the method comprises receiving an input signal based on a frequency domain signal.

In S2, the method comprises performing deprecoding on the received input signal

In S3, the method comprises providing the deprecoded signal as an input for a machine learning model, wherein the output of the machine learning model is a likelihood ratio.

The frequency domain signal may be a single carrier frequency domain signal or DFTS-OFDM signal.

Signal deprecoding is the inverse operation of signal precoding. If the signal precoding were realized by means of DFT precoding then iDFT deprecoding would be the inverse operation. The deprecoding may be performed by an iDFT deprecoding function.

The method may provide two schemes to augment DeepRx's compatibility with DFTS-OFDM signal detection.

In a first example embodiment, the input signal is the frequency domain signal. The method may comprise performing the deprecoding on a data branch of the input signal. The data branch may comprise frequency-time grid symbols $N_f \times N_t$, where $N_f$ comprises the number of subcarriers and $N_t$ comprises number of orthogonal frequency-division multiplexing, OFDM, symbols. The method may comprise concatenating the deprecoded signal with a raw channel estimate branch of the frequency domain signal and providing the concatenated signal as the input for the machine learning model. In this example embodiment, the machine learning model may be referred to as DeepRx.

In a first option, where the deprecoding is performed on the frequency domain signal, a pre-executed de-precoding function block is introduced on a received data branch before being concatenated with a raw channel estimation branch, and then fed to legacy DeepRx.

Figure 8:
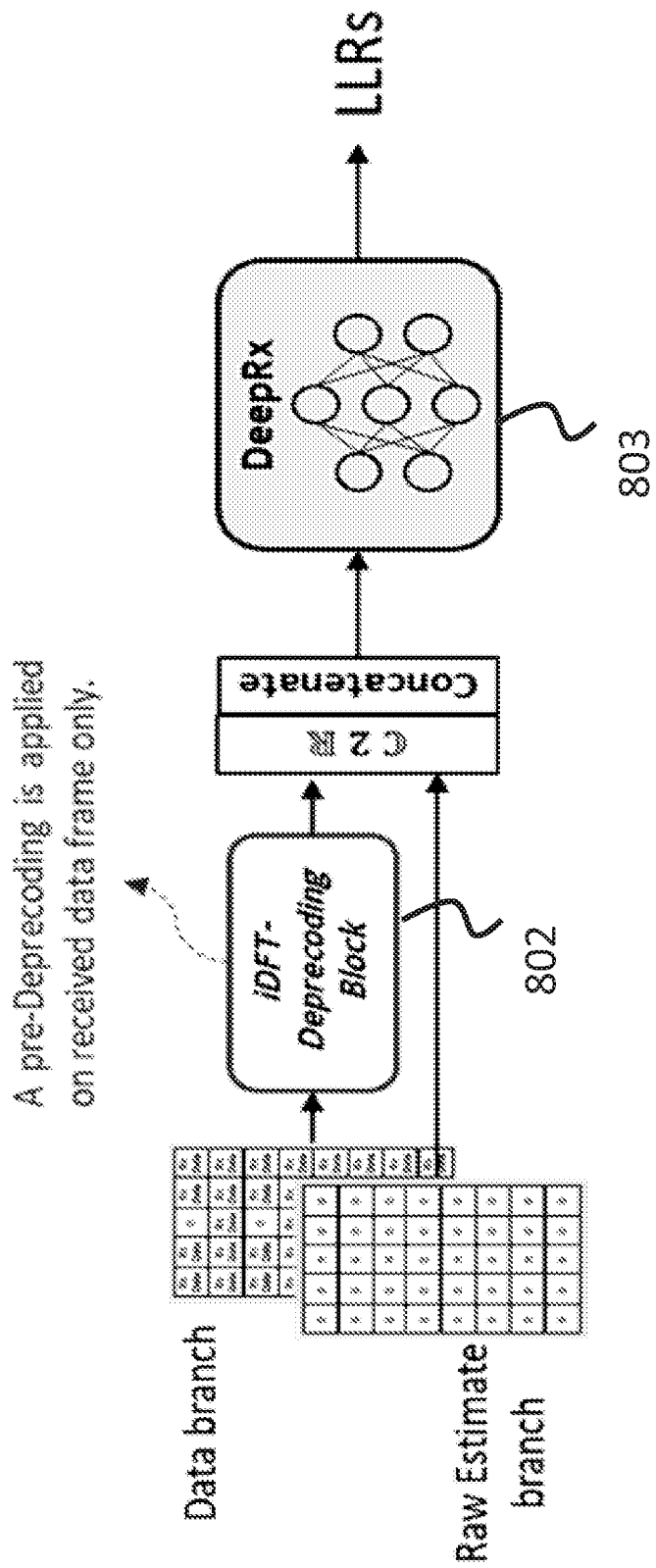
FIG. 8 shows a block diagram of a structure of a predeprecoded DeepRx according to an example embodiment.

FIG. 8 shows an example structure according to the first option. The inputs to DeepRx 803 remain the same as shown in FIG. 5, i.e., a data branch and a raw estimate branch, where the data branch is the frequency-time resource elements after FFT and the raw estimate branch is the raw estimated channel response based on sparse pilots. An iDFT deprecoding function 802 is introduced to be applied on the received data branch which behaves as a pre-deprecoding operation before the data is concatenated with a lower branch (a raw channel estimates branch) and then fed to the DeepRx 803.

Figure 9:
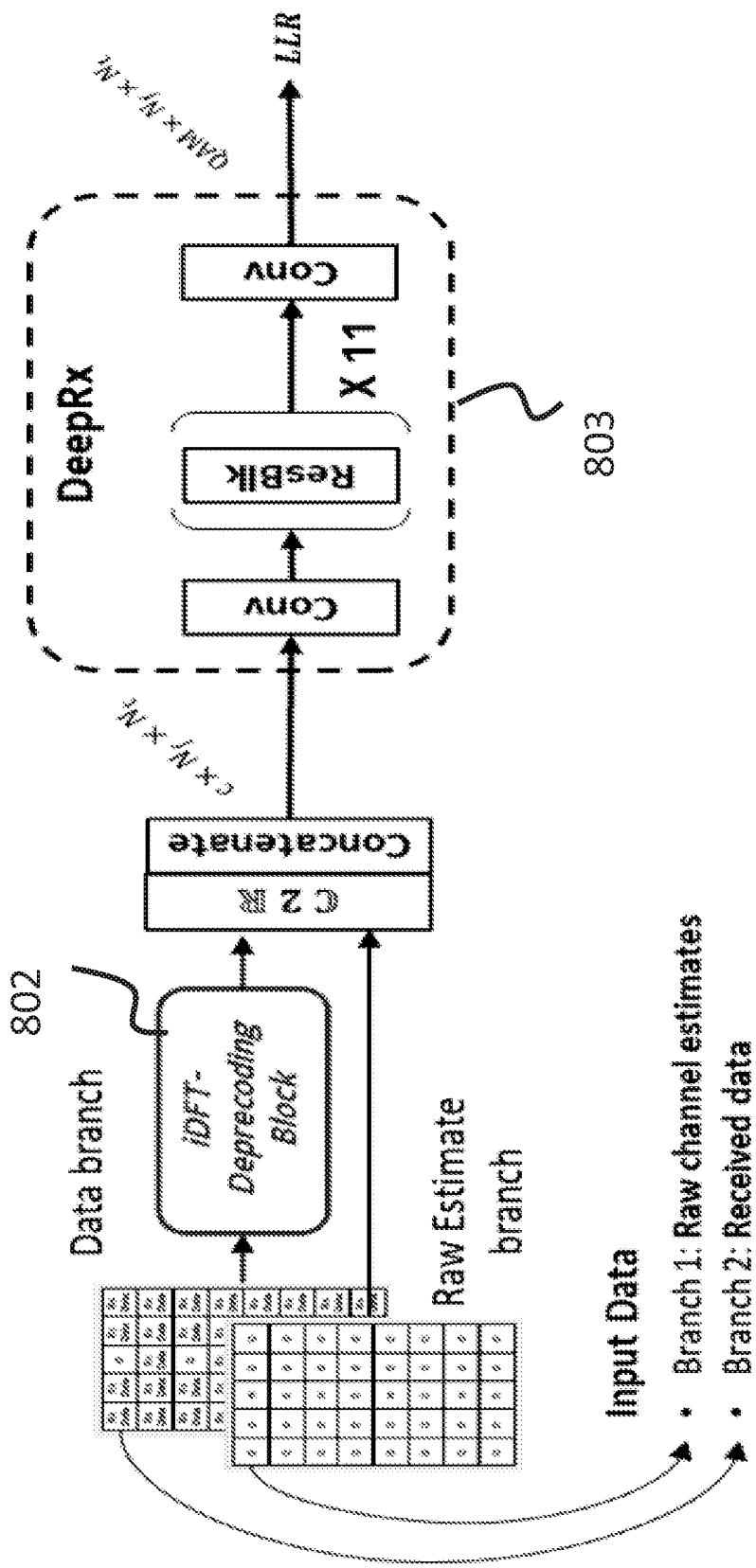
FIG. 9 shows a detailed block diagram of a structure of a predeprecoded DeepRx according to an example embodiment.

FIG. 9 shows a more detailed structure of the example shown in in FIG. 8.

Taking 1T1R transmission, the input data includes Branch 1 and Branch 2 which comprise the received symbols after FFT which transforms them to the frequency-time grid symbols with the size of $N_f \times N_t$, where $N_f$ refers to the number of subcarriers and $N_t$ refers to the number of OFDM symbols in one slot (which is 14 according to 3GPP definition). Branch 1 and 2 are the real part and imaginary part of the received symbols respectively. The DMRS occupied resource elements (RE) are set to be '0'.

The input data also includes Branch 3 and 4 which comprise the raw channel estimates branches where non-demodulation reference signals (DMRS) resource elements (RE) are set to be '0'. One branch size is also $N_f \times N_t$. Branch 3 and 4 are also the real part and imaginary part respectively.

All the branches are concatenated before being fed to the neural network (NN) 803.

The output data comprises bit LLRs with the dimension of $N_{mod} \times N_f \times N_t$, where $N_{mod}$ refers the number of bits per RE and depends on the modulation scheme.

In the training phase, the output will be used to compute a loss function with transmitted bits for model training. In the inference phase (application), the output will be fed to decoder.

The deprecoding is only applied to received symbols before being separated to real part and imaginary part. The deprecoding is a fixed operation following the conventional operation on frequency domain.

In the example structure shown in FIG. 9, the NN structure 803 (also referred to as DeepRx) includes 2 convolutional layers and 11 ResNet Block in between. Any other suitable NN structures may be used.

In a second example embodiment, the method may comprise providing the input signal, prior to deprecoding, to a further machine learning model for processing the input signal and performing deprecoding on an output of the further machine learning mode. In this embodiment, the input signal is a processed frequency domain signal (i.e., the frequency domain signal which has been processed by the further machine learning model).

In this example embodiment, the machine learning model may be referred to as PostDeepRx and the further machine learning model may be referred to as DeepRx.

In the second example embodiment, a cascaded design may be provided with a DeepRx-Deprecoding-PostDeepRx structure where a function block of deprecoding is embedded between the DeepRx and PostDeepRx whose parameters are jointly learnt and optimized.

The output of the further machine learning model in this example embodiment is $2 \times N_f \times N_t$, where $N_f$ comprises iDFT size and $N_t$ comprises the number of orthogonal frequency-division multiplexing, OFDM, symbols.

The output of the further machine learning model may further comprise a constellation monitoring output.

The constellation monitoring output may be provided for further analysis. The output of iDFT deprecoding has semantic meaning if the input and output of the iDFT deprecoding block is well designed. With further expert or machine type analysis, one can learn the hardware and channel conditions, or even DeepRx itself. In other words, this is one step towards making the DeepRx receiver explainable and consequently more trustworthy.

Figure 10:
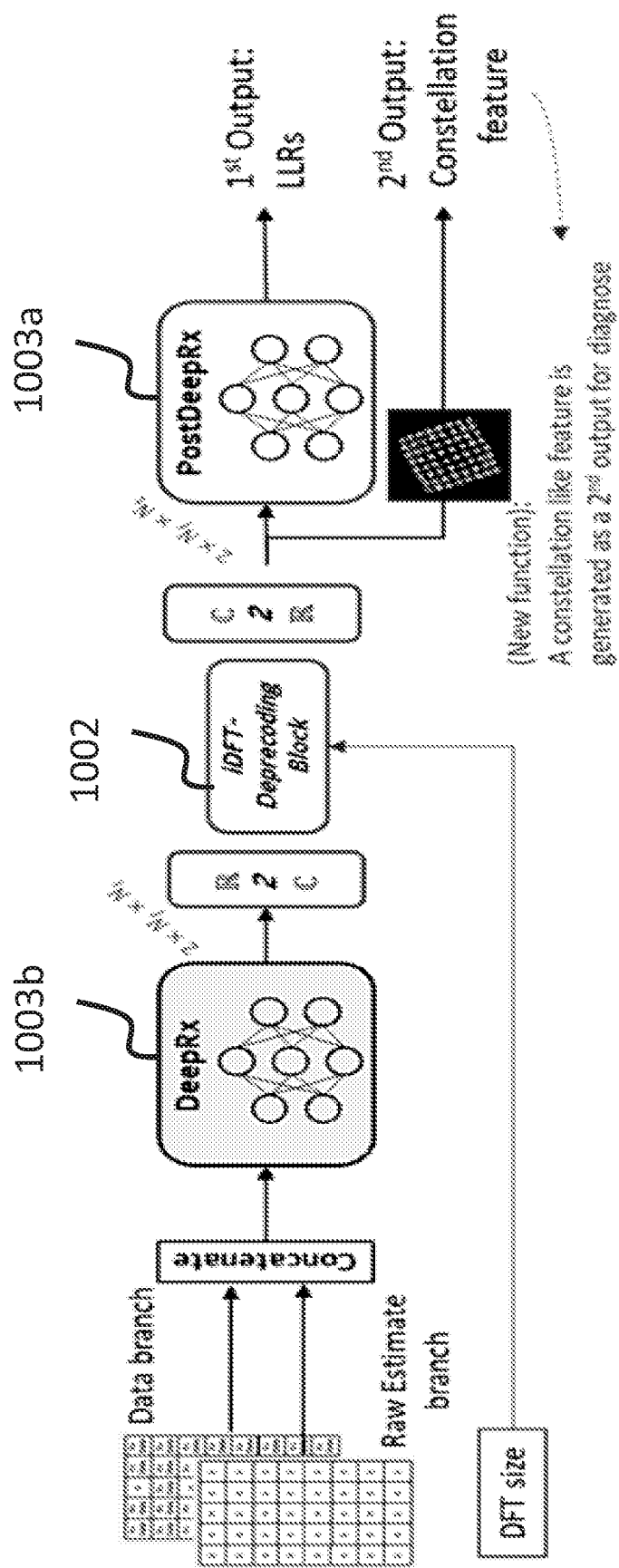
FIG. 10 shows a block diagram of a structure of a deprecoded embedded hybrid DeepRx according to an example embodiment.

FIG. 10 shows the general structure of an example according to the second option. The deprecoding function block 1002 is embedded between DeepRx 1003b and PostDeepRx 1003a. The data format of DeepRx 1003b output and PostDeepRx 1003a input size is designed to be $2 \times N_f \times N_t$ where $N_f$ and $N_t$ represent iDFT size and number of OFDM symbols, respectively. The dimension 2 refers to the real and imaginary part of the equalized signals.

Figure 11:
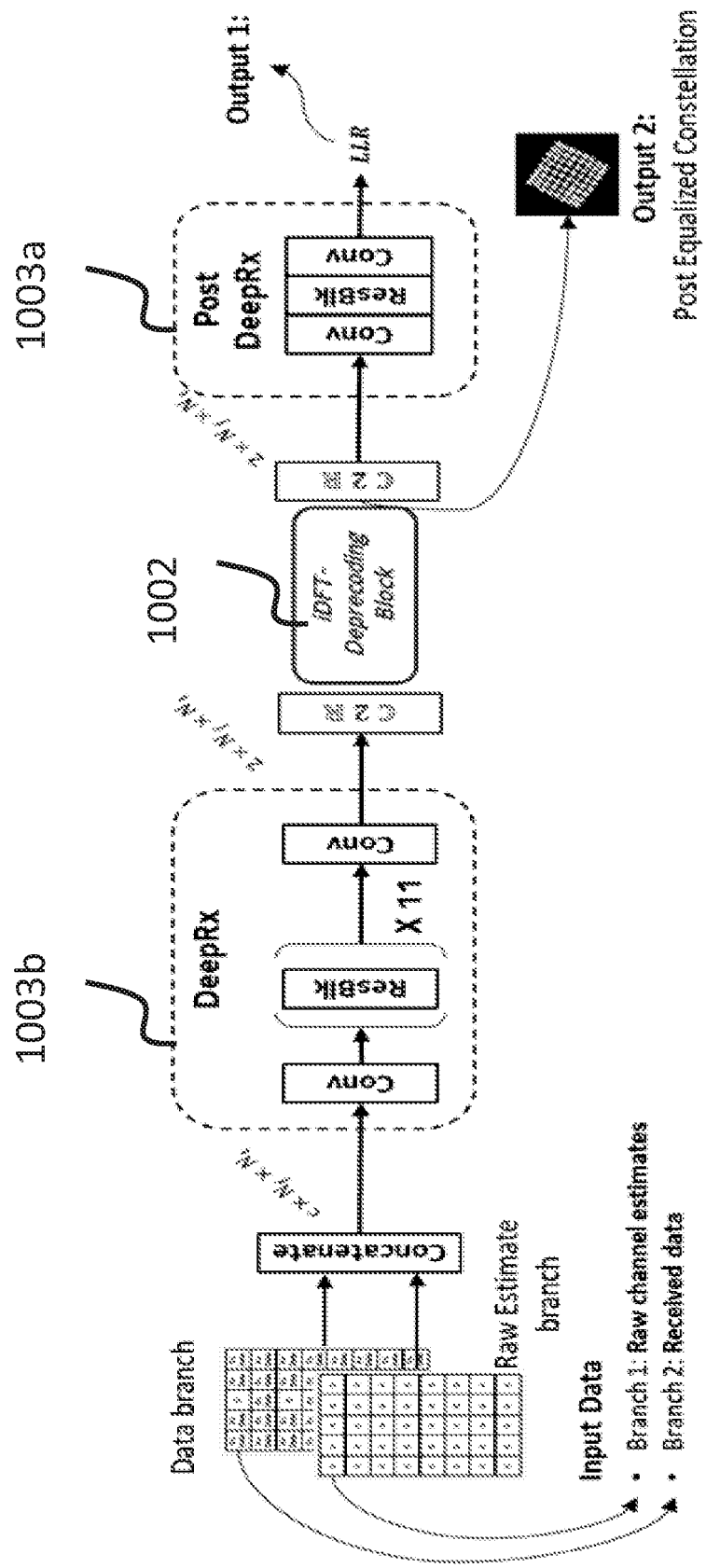
FIG. 11 shows a detailed block diagram of a structure of a deprecoded embedded hybrid DeepRx according to an example embodiment.

FIG. 11 shows a more detailed structure of the general structure in FIG. 10.

The input data in this example embodiment comprises a data branch and a raw estimate branch as described with reference to the first example embodiment. However, in this example, no pre-deprecoding is applied to the received symbols.

The output data of the machine learning model 1003a comprises bit LLRs with the dimension of $N_{mod} \times N_f \times N_t$ and the output of the further machine learning mode (1003b) comprises post equalised constellation-like pattern with the dimension of $2 \times N_f \times N_t$.

In the training phase, the Bit LLR output will be used to compute loss function with transmitted bits for model training. In the inference phase (application), the Bit LLR output will be fed to decoder, and the constellation-like pattern may be recorded for further analysis.

In the second example embodiment, the deprecoding function block 1002 is embedded between the NNs, which are described below.

The embedded deprecoding is a fixed operation and not learnable in back propagation. PreDeepRx and Post DeepRx may be jointly trained together.

In the second example embodiment, the DeepRx comprises two separate NNs as shown in FIG. 10.

The first NN, referred to as DeepRx NN 1003b, includes 2 convolutional layers and 11 ResNet Blocks. The kernel number of output convolutional layer is set to be 2 with output data dimension of $2 \times N_f \times N_t$.

The second NN, referred to as PostDeepRx 1003a, includes 2 convolutional layers and 1 ResNet in between. The kernel number of the input convolutional layer is 2 with input data dimension of $2 \times N_f \times N_t$. The kernel number of output convolutional layer depends on the modulation scheme.

Any other suitable NN structures may be used in place of the examples described with reference to the Figures.

The design of the output of DeepRx 1003b and input of PostDeepRx 1003a (of $2 \times N_f \times N_t$) may have two advantages.

One is to force the output of DeepRx 1003b to accord with the iDFT deprecoding, whose output can be sequentially coupled to PostDeepRx 1003a. DeepRx 1003b thus opens up a 'window' for constellation surveillance at the output of iDFT deprecoding block 1002. The intermediate constellation derived at the 2nd output branch may be perceived by human or machine type analysis for channel condition (e.g., nonlinearities, Dopplers) surveillance.

The other is to conduct PostDeepRx to learn a nonlinear demodulation detection, leaving DeepRx to serve as joint nonlinear channel estimator and equalizer. Thus, to some degree, it allows elaborate design of DeepRx and PostDeepRx according to the intermediate outcome of learned constellation patterns.

In both the first and second example embodiments as described above, the binary cross entropy may be used as a loss function. The formula is:

$$H = \sum_{i=1}^{N} y_i \log(P(y_i)) + (1 - y_i)\log(1 - P(y_i)))$$

Where $y_i$ represent binary bits 0/1 and $P(y_i)$ is the corresponding probability which is computed by feeding output LLRs to a sigmoid function. N is the total number of bits after channel encoding.

Non-Data RE positions are ignored for back propagation in training.

The deprecoding function block is fixed and not learned when training both ML models. The machine learning model may be trained either by Online Mode or Offline Mode. The offline training could be performed in other devices where model is not deployed.

The online training requires signaling and actions between both transmitter and receiver.

The devices for training the model may include functioning units in receivers (performing data set construction, data processing, model training, updating, deployment), transmitters (preparing training data and send it over the air) and other platforms, which can perform all the related processes.

The method may comprise causing a trigger to be sent to an apparatus (e.g., a transmitter such as a user equipment) for training the machine learning mode (and, if present, the further machine learning mode) and receiving an acknowledgment from the apparatus in response to the request.

The method may comprise providing training configuration information (e.g., but not limited to, carrier frequency, number of subcarriers, MCS, rank, transform precoding enabling indication (DFT precoding), sequence random seed, and number of transmission time intervals (TTI)) to the apparatus, receiving training data from the apparatus in response to the configuration information and providing the training data to an entity for training the machine learning model (and, if present, the further machine learning model). The entity for training the machine learning model and further machine learning model may be located at a receiver, another base station such a gNB or the cloud. The entity for training the machine learning model and the further machine learning model may be a Local Data Pool and Computing Unit (LDP&CU).

Figure 12:
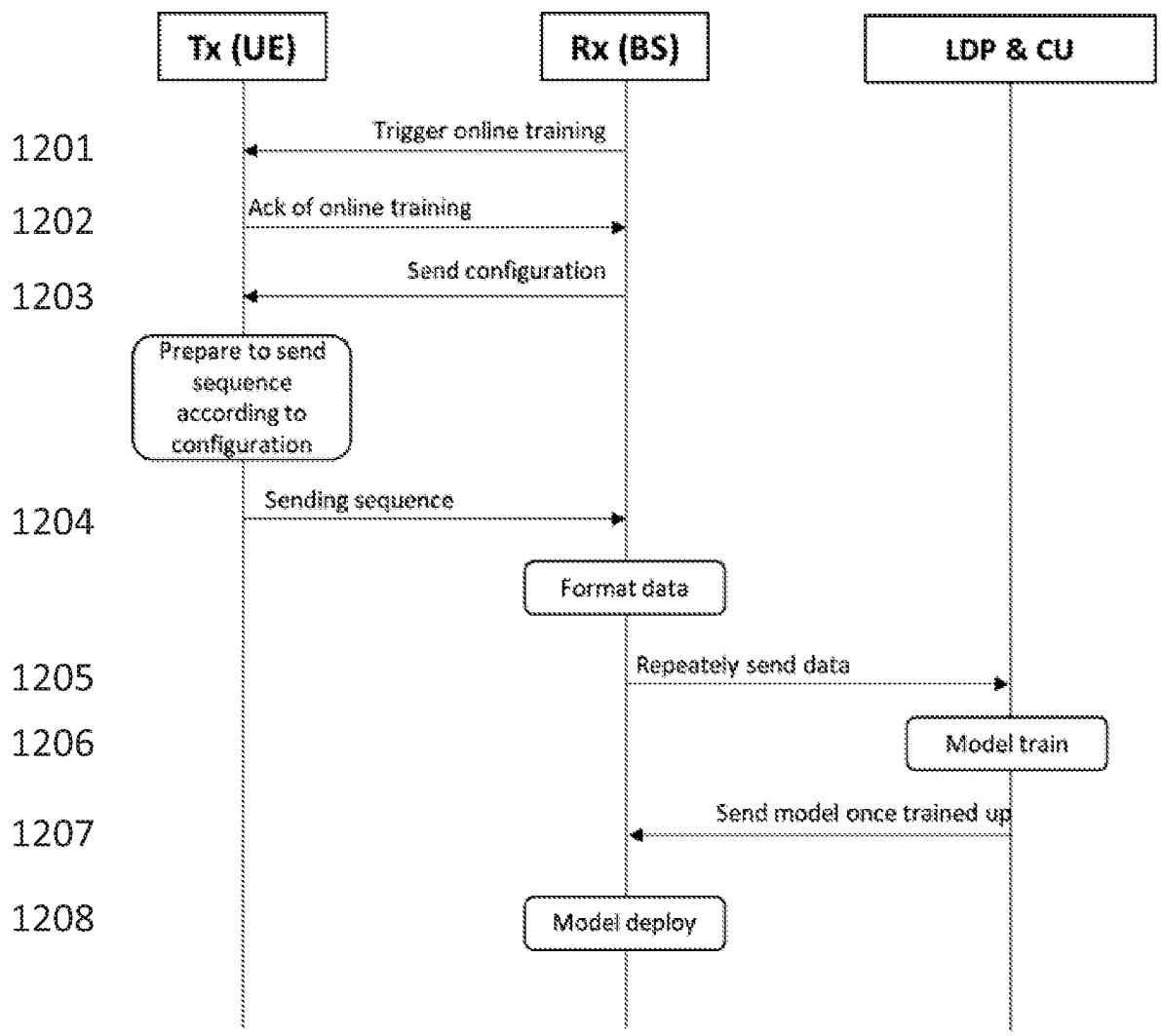
FIG. 12 shows a signalling diagram according to an example embodiment.

FIG. 12 shows an example signalling diagram for training the machine learning model in Online Mode.

In a first step 1201, the receiver (e.g., BS for uplink transmission) triggers the online training or fine-tuning.

In a second step 1202, the transmitter responds with acknowledges of training request.

In a third step 1203, the receiver sends the training configurations, which may include carrier frequency, number of subcarriers, MCS, rank, transform precoding enabling indication (DFT precoding), sequence random seed, number of TTI required for training, etc.

In a fourth step 1204, the transmitter sends the training sequence over the air. The training sequence should be known to receiver for computing loss.

In a fifth step 1205, the receiver sends the data to a Local Data Pool and Computing Unit (LDP&CU).

In a sixth step 1206, the model is trained in Computing Unit with training data in LDP.

In a seventh step 1207, the CU sends the trained model to the Receiver user plane.

In an eighth step 1208, the receiver deploys the model.

The model updating and finetuning may be viewed as part of online training process, which may be triggered periodically and non-periodically, by events. The steps for model updating and finetuning are as described above with respect to FIG. 12.

The receiver side may determine to deploy the machine learning model. For example, the method may comprise receiving deployment configuration information from a transmitter of the input signal and determining whether to deploy the machine learning model (and, if present, the further machine learning model) based on the deployment configuration information.

In an example embodiment, to apply the machine learning model for wireless transmission, a transmitter notifies the receiver with corresponding configurations. The receiver should determine to activate corresponding functioning blocks (such as deprecoding block) and select the corresponding neural network (NN) based on the configuration, before using DeepRx for signal processing.

The deployment configuration information may comprise at least one of an indication to perform the deprecoding on the frequency domain signal, subcarrier number information, modulation and coding scheme, rank and a fallback indicator.

Figure 13:
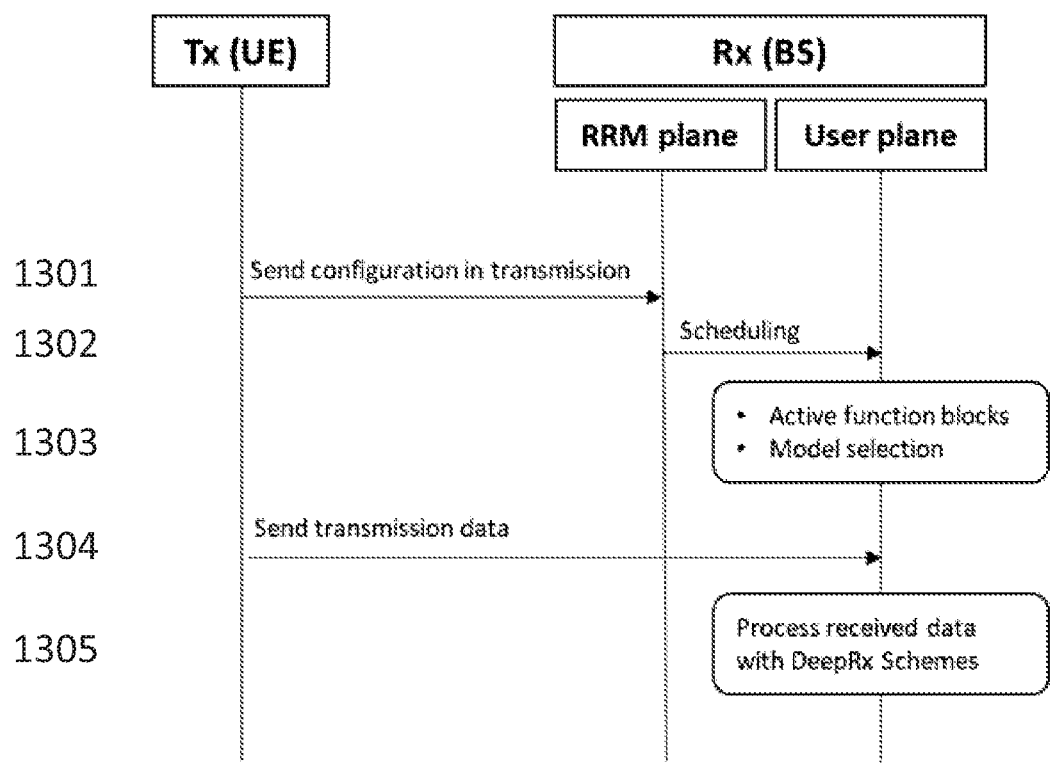
FIG. 13 shows a signalling diagram according to an example embodiment.

FIG. 13 shows a signalling diagram for an example deployment of the DeepRx.

In step 1 1301, the transmitter sends configurations to the receiver, including transform-precoding enabling information, subcarrier number, rank, MCS, etc.

In step 2 1302, the receiver schedules if the DeepRx should be used.

If not, fall back to conventional methods,

If yes, go to Step 3

In step 3 1303, based on the configuration, the receiver determines to enable the deprecoding function block and selects the network for current rank, MCS, etc.

In step 4 1304, the transmitter sends user data to the receiver.

In step 5 1305, the receiver processes the data with DeepRx

To schedule the DeepRx, RRM scheduler may notify the user plane of the receiver with information for DeepRx including, DFT-precoding enabling information, PRB numbers, Rank number, MCS, Fallback indicator, etc.

Figure 14:
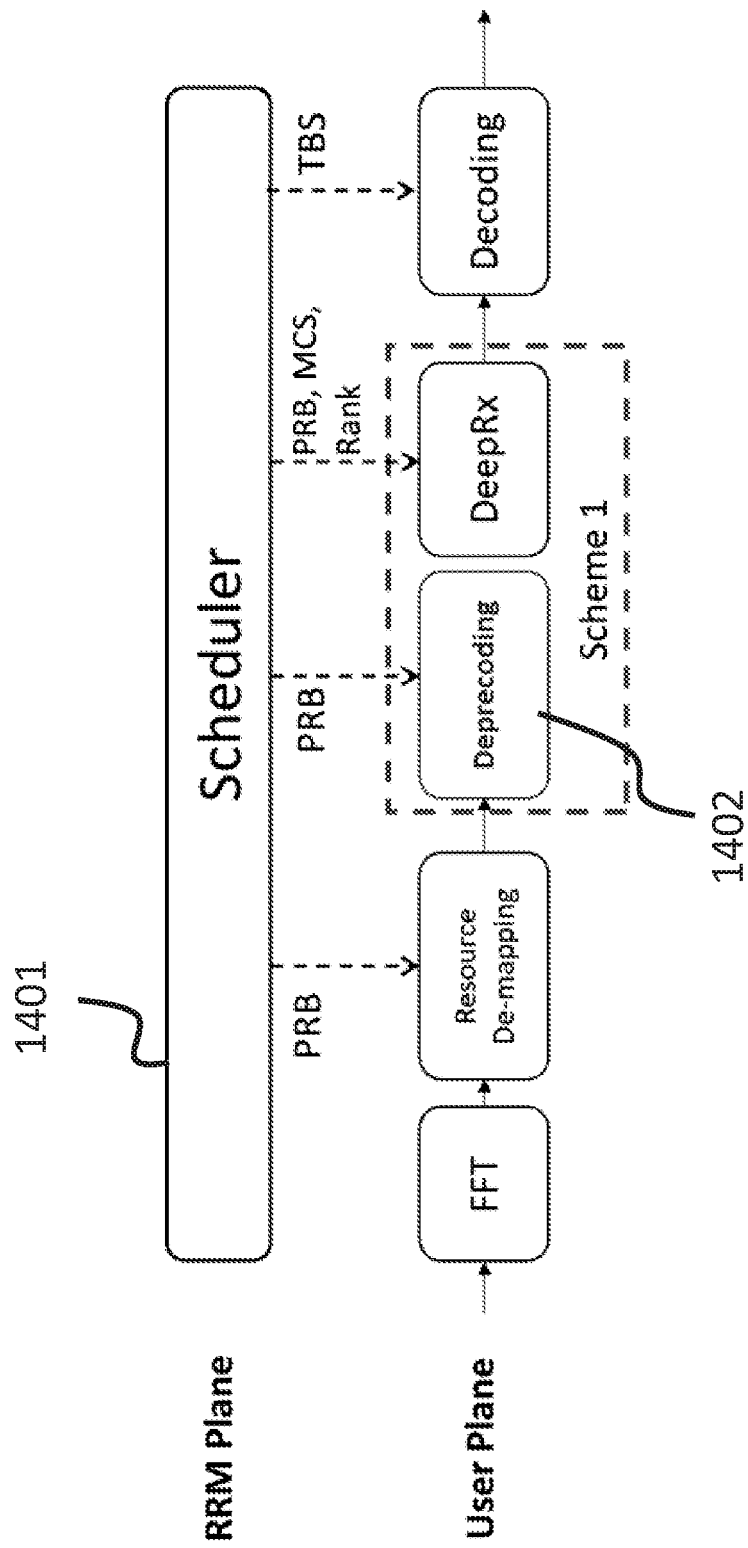
FIG. 14 shows a block diagram of scheduling according to an example embodiment.
Figure 15:
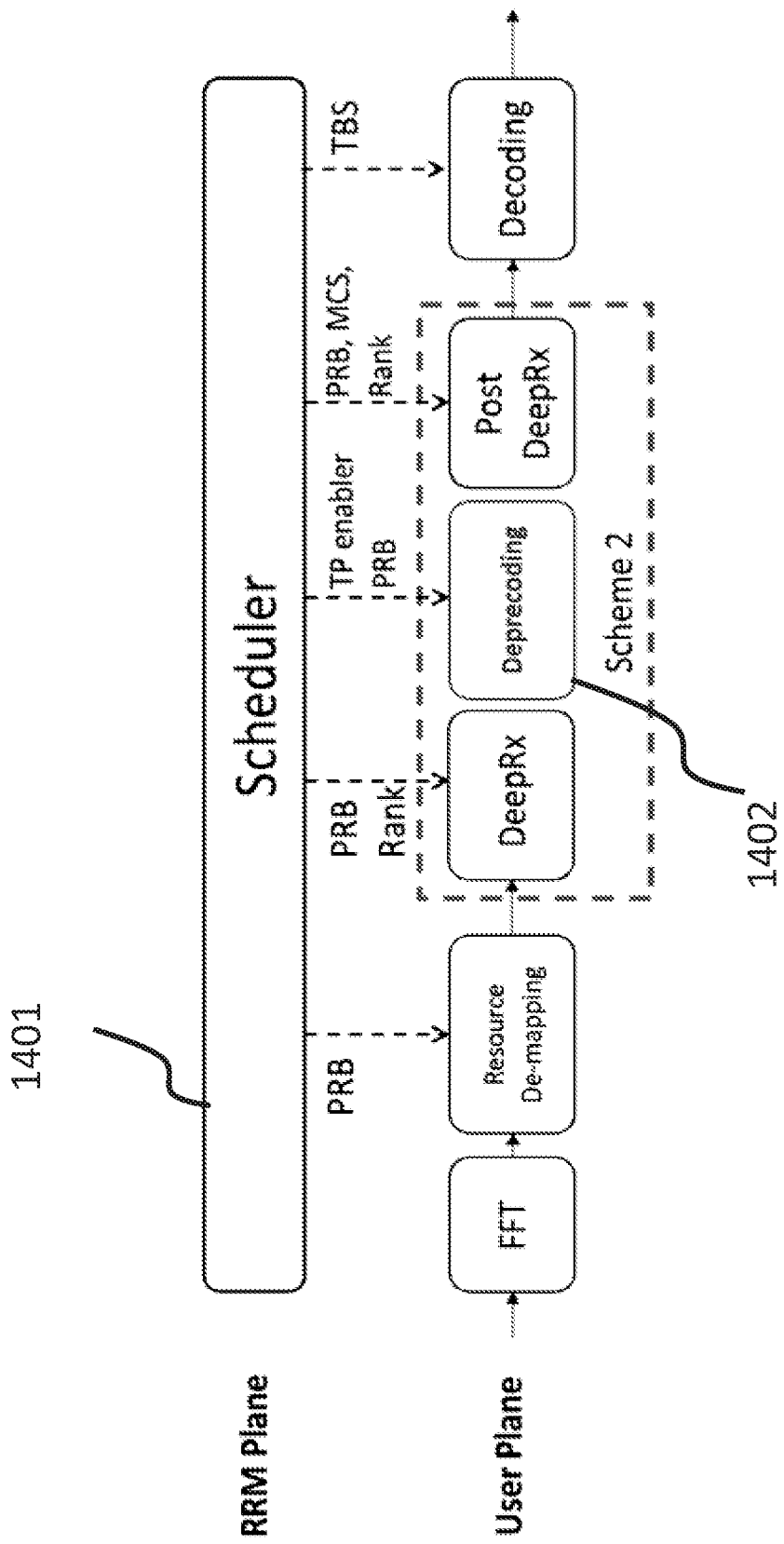
FIG. 15 shows a block diagram of scheduling according to an example embodiment.

The scheduling of DeepRx model for the first option and the second option is shown in FIGS. 14 and 15, respectively. The scheduler 1401 notifies the deprecoding block 1402 in both proposed schemes. As shown in FIGS. 14 and 15, the user plane signal processing blocks may be scheduled by RRM plane scheduler 1401 with information including at least one of transform-precoding (TP) enabling information, to activate the flexible deprecoding function block, subcarrier numbers or PRB numbers, for flexible deprecoding function (iDFT size), rank number (Currently only Rank 1 is supported for uplink DFTS-OFDM transmission in 3GPP), MCS, to determine the output kernel dimension of DeepRx and fallback indicator, to notify if the receiver should fall back to conventional methods or apply DeepRx.

In a first step, the RRM scheduler 1401 notifies DeepRx if DFT-precoding is enabled. In a second step, if DFT precoding is enabled, the deprecoding block 1402 for DeepRx is activated and if not the deprecoding function block 1402 is deactivated.

The scheduler may also schedule the Model Switch between OFDM and DFTS-OFDM, as well as Model Fallback to Conventional Receiver in corresponding scenarios. The method may comprise determining not to deploy the machine learning model (and, if present, the further machine learning model) based on the fallback indicator. For example, falling back to a conventional receiver may be triggered by the receiver side under conditions where the performance of DeepRx may deteriorate, e.g., continuous errors in transmission, etc.

The model falling back to conventional receiver may also trigger the Model Training (updating or finetuning as described above with reference to FIG. 12).

The receiver determines whether to fall back to conventional methods.

If the receiver determines to fall back to conventional methods, the RRM plane scheduler notifies the User plane to fall back to conventional methods and the receiver applies conventional methods. If not, the RRM plane scheduler notifies the User plane to apply DeepRx and the receiver applies DeepRx (i.e. deploys the machine learning model).

Both of the proposed schemes have been tested with a real-life proof of concept, the results showing the benefits of invented receiver architecture under realistic circumstances. According to these proof-of-concept evaluations, the second option may enable a faster convergence in training.

The proposed DeepRx schemes were evaluated with data from a testbed for wireless transmission. The hardware nonlinearity exists and the DFT-precoding is enabled in data collection phase in order to lower the PAPR in transmission. The Tx signal propagated over the air and was captured by receiver at a distance of about 4 feet.

The Tx/Rx antenna numbers are both 1. 2 DMRS symbols are used to estimate the channel. The transmission modulation scheme is 64 QAM. Table 1 shows a list of Configuration in Evaluation.

TABLE 1

| Parameters | Configuration |
| --- | --- |
| Tx/Rx | 1/1 |
| Modulation | 64QAM |
| Code Rate | 873/1024 |
| Subcarrier spacing | ~30 MHz |
| FFT size | 512 |
| Subcarrier number | 300 (25RB) |
| DMRS symbol | 3, 12 |
| DFT precoding | Enabled |

The proposed schemes were tested under the conditions with DFT-precoding enabled and compare them with conventional LMMSE receiver under configuration of 25 RB (300 subcarriers), code rate of 873/1024. There are 4000 subframes of data for training, and another 1000 subframes for inference.

Figure 16:
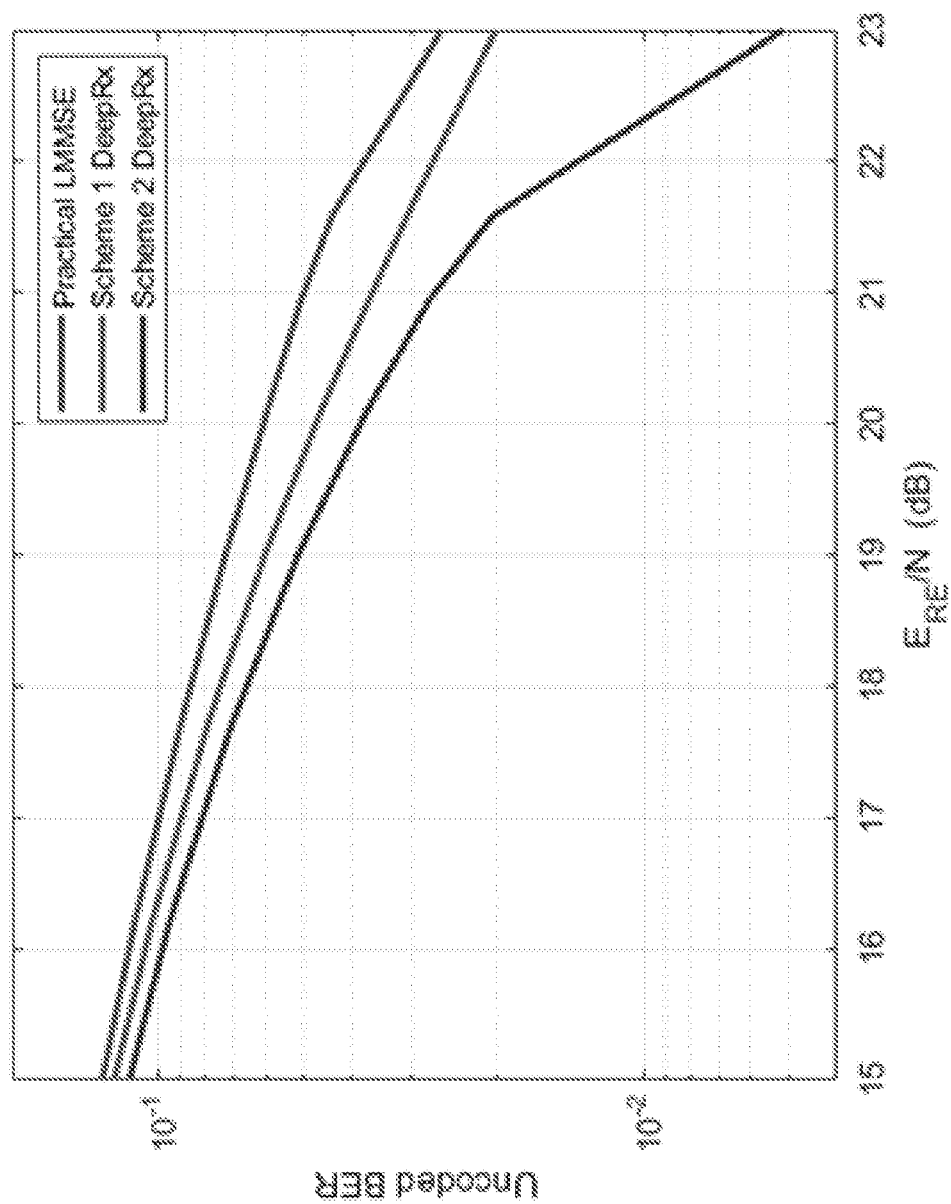
FIG. 16 shows uncoded bit error rate (BER) for a conventional receiver and a receiver according to a first and second example embodiment.
Figure 17:
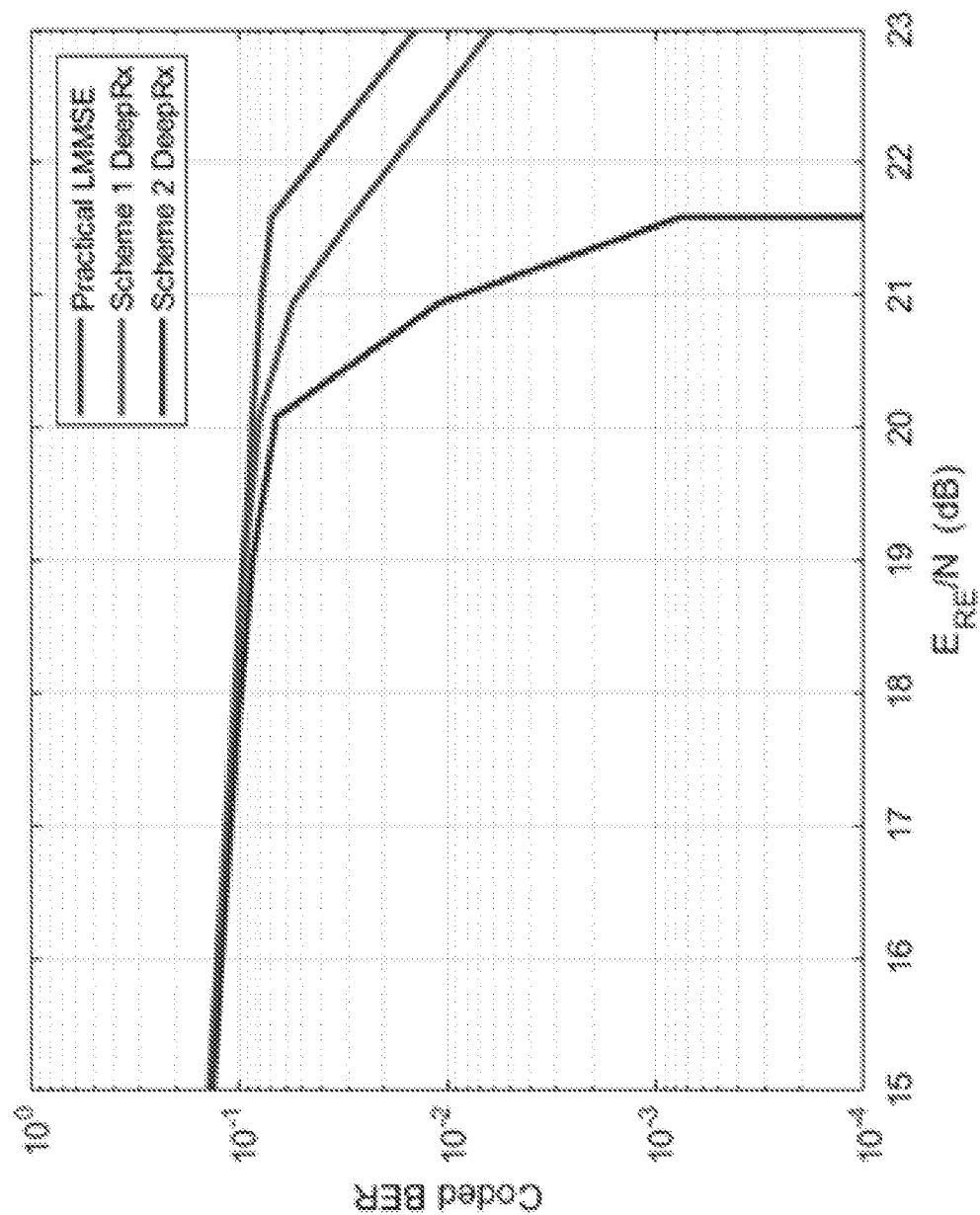
FIG. 17 shows coded BER for a conventional receiver and a receiver according to a first and second example embodiment.
Figure 18:
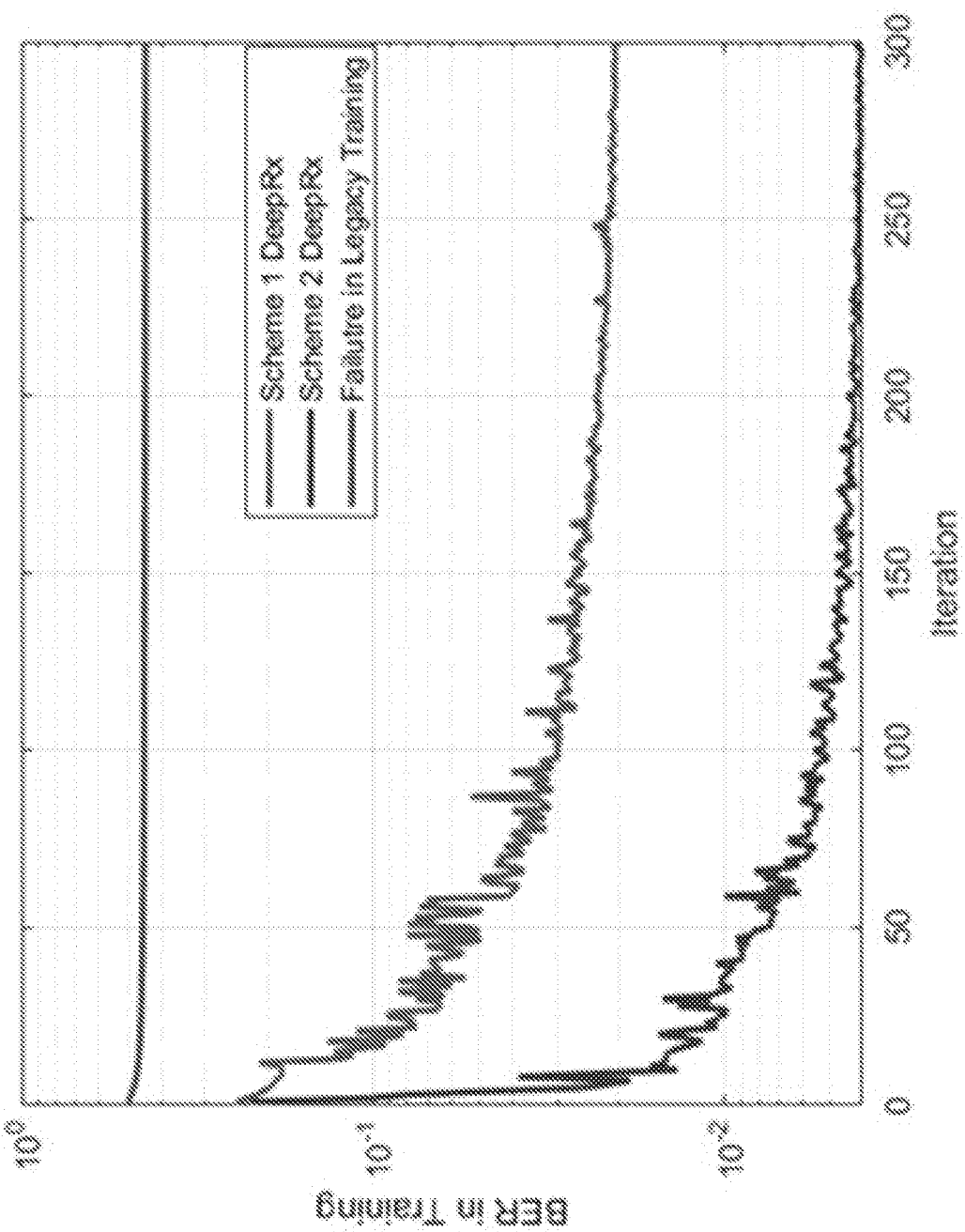
FIG. 18 shows BER in training for a conventional receiver and a receiver according to a first and second embodiment.

FIGS. 16 to 18 present the verification results from testing data (to inter the performance on data that was not pre-train). The uncoded and coded BER curves by evaluation are shown in FIG. 16 and FIG. 17, respectively. The top curves represent the BER by using conventional LMMSE receiver. The next curves down represent the performance by using Pre-iDFT-Deprecoded DeepRx, and the bottom curves are obtained from the iDFT-Deprecoding Embedded hybrid DeepRx.

The x axis is defined by $E_{RE}/N$ where $E_{RE}$ is the denoised signal power estimation and N is the noise estimation. In training phase, only the data at $E_{RE}/N$ of 23.15 dB (last $E_{RE}/N$ value in the figure) was employed, while in testing phase data from more $E_{RE}/N$ were used for inference.

It is clearly observed that, under the 10% uncoded BER level, the first option DeepRx shows 0.6 dB gain over Practical LMMSE receiver, while the second option DeepRx outperforms the conventional LMMSE receiver by roughly 1.2 dB. The uncoded BER is decreased to $\frac{1}{10}$ at training $E_{RE}/N$. In Coded BER curves, the first option shows possible ~1 dB gain over LMMSE, while the second option DeepRx may achieve>2 dB gain under 100% coded BER level. The second option achieves the error-free performance at training $E_{RE}/N$ while that from LMMSE stay at 1%~2% level.

There is also a faster convergence from the second option in the training process as shown by FIG. 18. It can be seen that the second option is faster in convergence and it converges at lower loss/BER level than the first option, while by using previous DeepRx the NN is not trained up.

Figure 19:
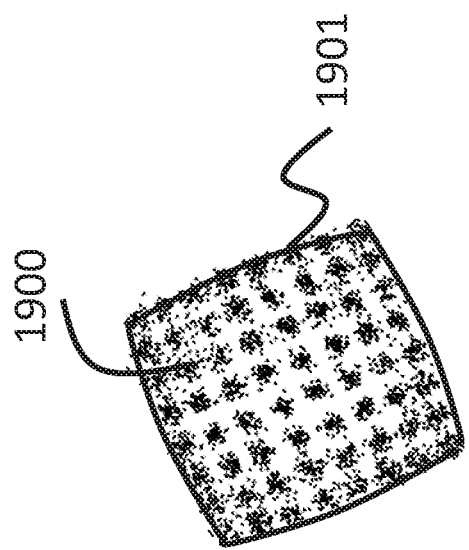
FIG. 19 shows a constellation output according to an example embodiment.

A constellation-like pattern 1900 as illustrated in FIG. 19 can be recorded by the 2nd output right after the embedded deprecoding layer from the iDFT-embedded hybrid DeepRx solution. It can be seen that the used the modulation scheme is 64QAM, albeit with some rotations. An inflation shape as marked by the black outline 1901 in FIG. 19 reflects the nonlinearity caused by power amplifier from the hardware of the testbed. Such a constellation-like pattern 1900 may reflect possible impairment in the transmission process. It may also help to understand the underlying mechanism of DeepRx.

Methods and apparatus as described with reference to FIGS. 7 to 15 augment DeepRx's compatibility with an DFTS-OFDM system. Much higher gain over a traditional LMMSE receiver for DFTS-OFDM may be achieved, e.g, 1% BER using conventional LMMSE receiver can be reduced to error-free by proposed DeepRx approach.

The second example embodiment may provide a second constellation like output, which can unveil the nonlinearity in hardware etc, as well as make DeepRx more explainable.

An apparatus for a receiver may comprise means for receiving an input signal, based on a frequency domain signal, means for performing precoding on the received input signal and means for providing the deprecoded signal as an input for a machine learning model, wherein the output of the machine learning model is a likelihood ratio.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus for a receiver, the apparatus comprising:
a processor; and
a memory storing instructions, which when executed by the processor, cause the apparatus to:
receive an input signal, based on a frequency domain signal;
provide the input signal to a first machine learning model for processing the input signal;
perform deprecoding on the processed input signal output by the first machine learning model;
provide the deprecoded signal as an input for a second machine learning model, wherein the output of the second machine learning model is a likelihood ratio.

2. The apparatus according to claim 1, wherein performing deprecoding includes using an inverse Discrete Fourier Transform, iDFT, deprecoding function.

3. The apparatus according to claim 1, wherein the input signal includes a data branch.

4. The apparatus according to claim 3, wherein the data branch comprises frequency-time grid symbols $N\_f \times N\_t$, where $N\_f$ comprises the number of subcarriers and $N\_t$ comprises a number of orthogonal frequency-division multiplexing, OFDM, symbols.

5. The apparatus according to claim 3, wherein, when executed by the processor, instructions cause the apparatus to concatenate the data branch of the input signal with a raw channel estimate branch of the frequency domain signal and provide the concatenated signal as the input for the first machine learning model.

6. The apparatus according to claim 1, wherein the output of the first machine learning model is $2 \times N\_f \times N\_t$, where $N\_f$ comprises iDFT size and $N\_t$ comprises a number of orthogonal frequency-division multiplexing, OFDM, symbols.

7. The apparatus according to claim 6, wherein the output of the further machine learning model further comprises a constellation monitoring output.

8. The apparatus according to claim 1, wherein, when executed by the processor, instructions cause the apparatus to
cause a trigger to be sent to a second apparatus for training the second machine learning model and the first machine learning model; and
receive an acknowledgment from the second apparatus in response to the request.

9. The apparatus according to claim 8, wherein, when executed by the processor, instructions cause the apparatus to
provide training configuration information to the second apparatus;
receive training data from the second apparatus in response to the configuration information; and
provide the training data to an entity for training the second machine learning model and the first machine learning model.

10. The apparatus according to claim 1, wherein, when executed by the processor, instructions cause the apparatus to receive deployment configuration information from a transmitter of the input signal; and determine whether to deploy the second machine learning model and the first machine learning model based on the deployment configuration information.

11. The apparatus according to claim 10, wherein the deployment configuration information comprises at least one of an indication to perform the deprecoding on the frequency domain signal, subcarrier number information, modulation and coding scheme, rank and a fallback indicator.

12. The apparatus according to claim 11, wherein, when executed by the processor, instructions cause the apparatus to determine not to deploy the second machine learning model and the first machine learning model based on the fallback indicator.

13. A method comprising, at a receiver:
receiving an input signal, based on a frequency domain signal;
providing the input signal to a first machine learning model for processing the input signal;
performing deprecoding on an output signal of the first machine learning model; and
providing the deprecoded signal as an input for a second machine learning model, wherein the output of the second machine learning model is a likelihood ratio.

14. The method according to claim 13, wherein performing deprecoding includes using an inverse Discrete Fourier Transform, iDFT, deprecoding function.

15. The method according to claim 13, wherein the input signal includes a data branch.

16. The method according to claim 15, wherein the data branch comprises frequency-time grid symbols $N\_f \times N\_t$, where N_f comprises the number of subcarriers and N_t comprises a number of orthogonal frequency-division multiplexing, OFDM, symbols.

17. An apparatus comprising: at least one processor and at least one memory including a computer program code, the at least one memory and computer program code configured to, with the at least one processor, cause the apparatus at least to, at a receiver:
  receive an input signal, based on a frequency domain signal;
  provide the input signal to a first machine learning model for processing the input signal;
  perform deprecoding on an output of the first machine learning model; and
  provide the deprecoded signal as an input for a second machine learning model, wherein the output of the second machine learning model is a likelihood ratio.

18. The apparatus according to claim 17, wherein performing deprecoding includes using an inverse Discrete Fourier Transform, iDFT, deprecoding function.

19. The apparatus according to claim 17, wherein the input signal includes a data branch.

20. The apparatus according to claim 19, wherein the data branch comprises frequency-time grid symbols N_f×N_t, where N_f comprises the number of subcarriers and N_t comprises a number of orthogonal frequency-division multiplexing, OFDM, symbols.

\* \* \* \* \*